(12) United States Patent
Estevez et al.

(10) Patent No.: US 11,903,076 B2
(45) Date of Patent: Feb. 13, 2024

(54) METHOD AND APPARATUS FOR SETTING TIMER VALUE IN NETWORK

(71) Applicant: Samsung Electronics Co., Ltd., Suwon-si (KR)

(72) Inventors: David Gutierrez Estevez, Staines (GB); Kisuk Kweon, Suwon-si (KR); Joan Pujol Roig, Staines (GB); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/186,581

(22) Filed: Mar. 20, 2023

(65) Prior Publication Data

US 2023/0239960 A1 Jul. 27, 2023

Related U.S. Application Data

(63) Continuation of application No. 17/376,472, filed on Jul. 15, 2021, now Pat. No. 11,638,322.

(30) Foreign Application Priority Data

Aug. 13, 2020 (GB) .................................... 2012661.1
Jul. 13, 2021 (KR) ........................ 10-2021-0091666

(51) Int. Cl.
*H04W 76/25* (2018.01)
*H04W 24/02* (2009.01)

(52) U.S. Cl.
CPC ........... *H04W 76/25* (2018.02); *H04W 24/02* (2013.01)

(58) Field of Classification Search
CPC ..... H04W 76/25; H04W 24/02; H04W 72/04; H04W 76/32; H04W 76/36
See application file for complete search history.

(56) References Cited

U.S. PATENT DOCUMENTS 7,415,026 B2   8/2008   Hsu et al.
8,935,381 B2   1/2015   Kalavade
(Continued)

FOREIGN PATENT DOCUMENTS

KR   10-2020-0044111 A   4/2020
WO   2019/114810 A1   6/2019
(Continued)

OTHER PUBLICATIONS

3GPP TR 23.700-91 V0.4.0; 3rd Generation Partnership Project; Technical Specification Group Services and System Aspects; Study on enablers for network automation for the 5G System (5GS); Phase 2, (Release 17), Jul. 1, 2020.
(Continued)

*Primary Examiner* — Joshua L Schwartz
(74) *Attorney, Agent, or Firm* — Jefferson IP Law, LLP (57) ABSTRACT

A method for setting a value of an inactivity timer for transitioning between states of a data session in a network comprising a first entity and a second entity providing network analytics is provided. The method includes obtaining, by the second entity, input data comprising communication description information for at least one user equipment (UE), and providing, by the second entity to the first entity, output analytics generated based on the input data, the output analytics comprising UE communications analytics for each data session where the output analytics are used to determining whether to update a value of an inactivity timer for a data session.

20 Claims, 5 Drawing Sheets

(56) References Cited

U.S. PATENT DOCUMENTS

| | | |
|---|---|---|
| 11,070,456 B2 | 7/2021 | Di Girolamo et al. |
| 2019/0253917 A1 | 8/2019 | Dao |
| 2019/0357298 A1 | 11/2019 | Li et al. |
| 2020/0213897 A1 | 7/2020 | Qiao et al. |
| 2020/0228420 A1 | 7/2020 | Dao et al. |
| 2020/0267689 A1 | 8/2020 | Chen et al. |
| 2020/0329455 A1* | 10/2020 | Ryu ............ H04W 28/0865 |
| 2021/0337585 A1 | 10/2021 | Liu et al. |

FOREIGN PATENT DOCUMENTS

| | | |
|---|---|---|
| WO | 2019/219619 A1 | 11/2019 |
| WO | 2020/001336 A1 | 1/2020 |
| WO | 2020/025556 A1 | 2/2020 |
| WO | 2020/069662 A1 | 4/2020 |

OTHER PUBLICATIONS

3GPP TR 28.809 V0.4.0; 3rd Generation Partnership Project; Technical Specification Group Services and System Aspects; Management and orchestration; Study on enhancement of Management Data Analytics (MDA), (Release 17), Jun. 17, 2020.

3GPP TS 23.288 V16.4.0; 3rd Generation Partnership Project; Technical Specification Group Services and System Aspects; Architecture enhancements for 5G System (5GS) to support network data analytics services, (Release 16), Jul. 9, 2020.

3GPP TS 23.502 V16.5.0; 3rd Generation Partnership Project; Technical Specification Group Services and System Aspects; Procedures for the 5G System (5GS); Stage 2, (Release 16), Jul. 9, 2020.

International Search Report dated Oct. 14, 2021, issued in an International Application No. PCT/KR2021/008971.

Written Opinion dated Oct. 14, 2021, issued in an International Application No. PCT/KR2021/008971.

Extended European Search Report dated Jan. 19, 2022, issued in a counterpart European Application No. 21186714.8-1212 / 3955695.

CATT; One Solution for Key Issue #2: Extend Service Concept into User Plane; 3GPP TSG-SA2 Meeting #128; S2-186697; Jun. 26, 2018, Vilnius, Lithuania.

Great Britain Office Action dated Jan. 31, 2023, issued in a counterpart GB Application No. 2012661.1.

Scott Fowler, Ahmed Omar Shahidullah, Mohammed Osman, Johan M. Karlsson and Di Yuan, Analytical evaluation of extended DRX with additional active cycles for light traffic, 2015, The International Journal of Computer Networks (COMN ET), Elsevier, (77), 90-102 (Year. 2015).

* cited by examiner

METHOD AND APPARATUS FOR SETTING TIMER VALUE IN NETWORK

CROSS-REFERENCE TO RELATED APPLICATION(S)

This application is a continuation application of prior application Ser. No. 17/376,472 filed on Jul. 15, 2021, which is based on and claims priority under 35 U.S.C § 119(a) of a United Kingdom patent application number 2012661.1, filed on Aug. 13, 2020, in the United Kingdom Intellectual Property Office, and of a Korean patent application number 10-2021-0091666, filed on Jul. 13, 2021, in the Korean Intellectual Property Office, the disclosure of each of which is incorporated by reference herein in its entirety.

BACKGROUND

1. Field

The disclosure relates to methods, apparatus and systems for setting a value of a timer for transitioning between states of a data session in a network.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Herein, the following documents are referenced:
[1] 3rd Generation Partnership Project (3GPP) Technical Report (TR) 28.809: Study on enhancement of Management Data Analytics (MDA), Rel-17 (06-2020).
[2] 3GPP TS 23.288: Architecture enhancements for 5G System (5GS) to support network data analytics services, Rel-16 (06-2020).
[3] 3GPP TR 23.700-91: Study on enablers for network automation for the 5G System (5GS); Phase 2, Rel-17 (06-2020).
[4] 3GPP TS 23.502: Procedures for the 5G System (5GS), Rel-16 (06-2020).

Various acronyms, abbreviations and definitions used in the disclosure are defined at the end of this description.

Artificial intelligence (AI) has been identified as a key enabler for end-to-end network automation in 5G in all network domains, including the domains subject to the standardization process of a radio access network (RAN), a core network (CN), and management system, also known as operations, administration and maintenance (OAM). Hence, standardization and industry bodies are now in the process of developing specification support for data analytics to enable AI models assist with the ever-increasing complex task of autonomously operating and managing the network.

On the RAN side, the pioneering O-RAN alliance was established in 2018 by leading operators with the vision of developing open specifications for an open and efficient RAN that leverages AI for automating different network functions (NFs) and reducing operating expenses (OPEX).

Furthermore, standardized support for data analytics by 3GPP is particularly advanced already in Rel-16 on the CN side and the control plane. A data analytics framework anchored in the new so-called network data analytics function (NWDAF), located within the 5GC as a network function following the service-based architecture principles of 5GC has been defined with the purpose of enhancing multiple control-plane functionalities of the network. Moreover, on the OAM side a management data analytics service (MDAS) is also being specified by 3GPP to assist in dealing with longer-term management aspects of the network [1]. The joint operation of RAN analytics entities, network data analytics function (NWDAF) and MDAS is still work in progress within the relevant bodies.

It is desirable to be able to activate and deactivate 5G protocol data unit (PDU) sessions on a UE. Such functionality typically resides within the control plane of the CN since it requires decisions being made at a fast timescale, typically much faster than what network management and orchestration systems allow.

5G standards by the 3rd Generation Partnership Project (3GPP) have already developed support for individual and dynamic activation and deactivation of each PDU session a UE has established, but the different transitions from PDU session deactivation to activation as well as the associated UE state incur significant control signaling overhead in the network.

Hence, such transitions need to be carefully controlled so that the gains of deactivating PDU sessions will not be offset by the signaling overhead caused by the transitions. An adaptive inactivity timer for individual UE is a tool proposed to address this problem, but it did not consider the per-PDU-session granularity required to optimize inactivity timer value in a 5G network. Furthermore, setting the appropriate value at each time instant was done based on a heuristic algorithm, hence resulting in sub-optimal performance.

In order to minimize the UE battery power consumption and network resource usage, assigning an appropriate value to the inactivity timer is crucial. The inactivity timer is designed for controlling the timing of state transitions of a PDU session and eventually a UE. Shortening the length of the inactivity timer may help the UE consume less battery power by staying the UE in CM-IDLE state longer while turning the radio module off, but it incurs frequent transitions of PDU session activation states and UE CM states causing massive control signaling overhead in the network. Particularly, in the case of changing the state of the UE from CM-IDLE to CM-CONNECTED, the required paging message is broadcasted over several cells, consuming a quite significant amount of radio resources. However, prolonging the length of the inactivity timer too much may decrease the efficiency of utilization of radio resources and cause more battery power consumption in the UE experiencing a long tail time during which the UE stays in CM-CONNECTED before transitioning to CM-IDLE.

What is desired is a technique for setting or adjusting a value of an inactivity timer to optimize overall performance.

The above information is presented as background information only to assist with an understanding of the disclosure. No determination has been made, and no assertion is made, as to whether any of the above might be applicable as prior art with regard to the disclosure.

For example, certain examples of the disclosure may provide methods, apparatus and systems for setting a value of an inactivity timer for transitioning between active/inactive states of a PDU session in a 3GPP 5G network based on NWDAF analytics.

SUMMARY

Aspects of the disclosure are to address at least the above-mentioned problems and/or disadvantages and to provide at least the advantages described below. Accordingly, an aspect of the disclosure is to provide a method and an apparatus for setting a value of a timer for transitioning between states of a data session in a network.

Additional aspects will be set forth in part in the description which follows and, in part, will be apparent from the description, or may be learned by practice of the presented embodiments.

In accordance with an aspect of the disclosure, a method for setting a value of an inactivity timer for transitioning between states of a data session in a network comprising a first entity and a second entity providing network analytics is provided. The method performed by the second entity includes obtaining, by the second entity, input data comprising communication description information for at least one user equipment (UE), and providing, by the second entity to the first entity, output analytics generated based on the input data, the output analytics comprising UE communications analytics for each data session, wherein the output analytics are used to determining whether to update a value of an inactivity timer for a data session.

In accordance with another aspect of the disclosure, a telecommunication network operable to perform the method of the first aspect is provided.

In accordance with another aspect of the disclosure, a method for setting a value of an inactivity timer for transitioning between states of a data session in a network comprising a first entity and a second entity providing network analytics is provided. The method performed by the first entity includes transmitting, by the first entity to the second entity, input data comprising communication description information for at least one user equipment (UE), receiving, by the first entity, from the second entity, output analytics generated based on the input data, the output analytics comprising UE communications analytics for each data session, and determining transitions between states of a data session by using a value of a inactivity timer for the data session updated based on the output analytics.

In accordance with another aspect of the disclosure, an apparatus for setting a value of an inactivity timer for transitioning between states of a data session in a network comprising a first entity and a second entity providing network analytics is provided. The apparatus of the second entity includes a transceiver, and a processor coupled with the transceiver and configured to perform the operations of obtaining input data comprising communication description information for at least one user equipment (UE), and providing, to the first entity output analytics generated based on the input data, the output analytics comprising UE communications analytics for each data session, wherein the output analytics are used to determining whether to update a value of an inactivity timer for a data session.

In accordance with another aspect of the disclosure, an apparatus for setting a value of an inactivity timer for transitioning between states of a data session in a network comprising a first entity and a second entity providing network analytics is provided. The apparatus of the first entity includes a transceiver, and a processor coupled with the transceiver and configured to perform the operations of transmitting, to the second entity, input data comprising communication description information for at least one user equipment (UE), receiving, from the second entity, output analytics generated based on the input data, the output analytics comprising UE communications analytics for each data session, and determining transitions between states of a data session by using a value of a inactivity timer for the data session updated based on the output analytics.

It is an aim of certain examples of the disclosure to address, solve and/or mitigate, at least partly, at least one of the problems and/or disadvantages associated with the related art, for example at least one of the problems and/or disadvantages described herein. It is an aim of certain examples of the disclosure to provide at least one advantage over the related art, for example at least one of the advantages described herein.

The disclosure is defined in the independent claims. Advantageous features are defined in the dependent claims.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the disclosure.

The terms and words used herein are not limited to the bibliographical or standard meanings, but, are merely used to enable a clear and consistent understanding of the disclosure.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the disclosure are to be understood to be applicable to any other aspect, embodiment, example or claim described herein unless incompatible therewith.

Certain examples of the disclosure provide methods, apparatus and systems for setting a value of a timer for transitioning between states of a data session in a network. The following examples are applicable to, and use terminology associated with, 3GPP 5G. For example, certain examples of the disclosure provide methods, apparatus and systems for setting a value of an inactivity timer for transitioning between active/inactive states of a PDU session in a 3GPP 5G network based on NWDAF analytics. However, the skilled person will appreciate that the techniques disclosed herein are not limited to these examples or to 3GPP 5G, and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network.

For example, the functionality of the NWDAF in the examples below may be applied to any other suitable type of entity providing network analytics; the functionality of the user plane function (UPF) in the examples below may be applied to any other suitable type of entity providing user plane functions; the functionality of the access and mobility management function (AMF) in the examples below may be applied to any other suitable type of entity performing mobility management functions; the functionality of the session management function (SMF) in the examples below may be applied to any other suitable type of entity performing session management functions; and the functionality of the AF in the examples below may be applied to any other suitable type of entity performing corresponding application functions.

The skilled person will appreciate that the disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the disclosure may be provided in the form of an apparatus/device/network entity configured to perform one or more defined network functions and/or a method therefor. Certain examples of the disclosure may be provided in the form of a system (e.g., a network) comprising one or more such apparatuses/devices/network entities, and/or a method therefor.

A network may include one or more of a user equipment (UE), a radio access network (RAN), an access and mobility management function (AMF) entity, a session management function (SMF) entity, a user plane function (UPF) entity, a network data analytics function (NWDAF) entity, an application function (AF) entity, and one or more other network function (NF) entities.

A particular network function can be implemented either as a network element on a dedicated hardware, as a software instance running on a dedicated hardware, or as a virtualized function instantiated on an appropriate platform, e.g., on a cloud infrastructure. A NF service may be defined as a functionality exposed by a NF through a service based interface and consumed by other authorized NFs.

As mentioned above, what is desired is a technique for setting or adjusting a value of an inactivity timer to optimize overall performance.

Certain examples of the disclosure enable an optimization of the trade-off between UE battery consumption and network resource efficiency described above by leveraging the standardized data analytics framework. Hence, a compliant AI-based solution using data analytics may be based on the NWDAF framework. A brief overview of the NWDAF framework, for example as defined in [2], will now be described.

In the disclosure, the following acronyms, abbreviations and definitions may be used.

Figure 1:
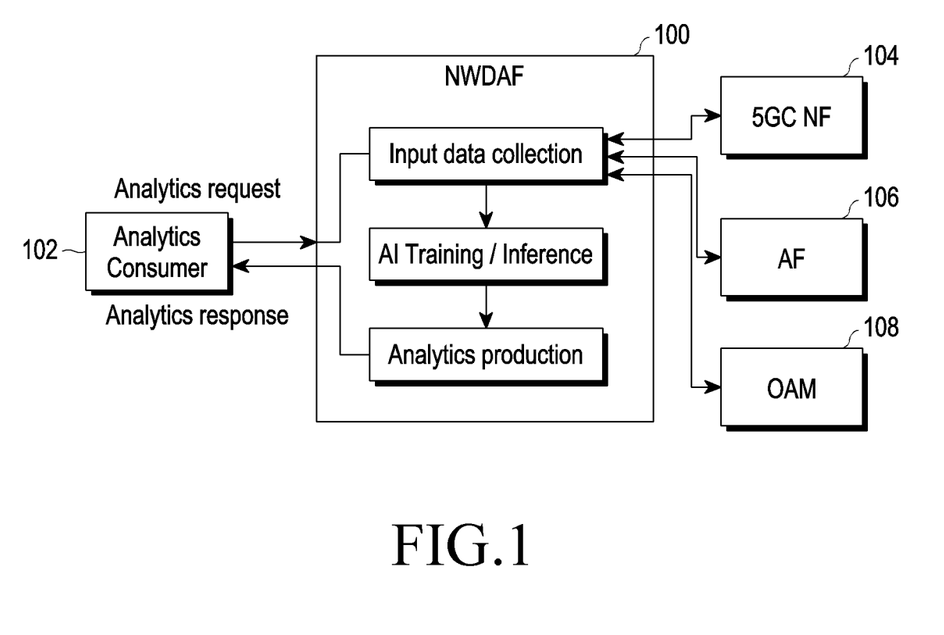
FIG. 1 illustrates an operation of network data analytics function (NWDAF) according to an embodiment of the disclosure.

3GPP: 3rd Generation Partnership Project
5G: 5th Generation
5GC: 5G Core Network 5
5GS: 5G System
AF: Application Function
AI: Artificial Intelligence
AMF: Access and Mobility Management Function
CM: Connection Management
CN: Core Network
CPU: Central Processing Unit
DL: DownLink
DNN: Data Network Name
gNB: 5G Base Station
GPSI: General Public Subscription Identifier
ID: Identifier/Identity
LTE: Long Term Evolution
MDA: Management Data Analytics
MDAS: Management Data Analytics Service
N4: Interface between SMF and UPF
NF: Network Function
NG: Next Generation
NRF: Network Repository Function
NWDAF: Network Data Analytics Function
OAM: Operation and Maintenance
OPEX: Operating Expenses
PDU: Protocol Data Unit
RAN: Radio Access Network
Rel: Release
RRC: Radio Resource Control
SLA: Service Level Agreement
SMF: Session Management Function
S-NSSAI: Single Network Slice Selection Assistance Information
SUPI: Subscription Permanent Identifier
TA: Tracking Area
TAC: Type Allocation Code
TR: Technical Report
TS: Technical Specification
UE: User Equipment
UL: UpLink
UPF: User Plane Function FIG. 1 illustrates an operation of NWDAF according to an embodiment of the disclosure. The recently frozen 3GPP Rel-16 has specified the NWDAF framework as illustrated in FIG. 1. In the basic operation of NWDAF illustrated in FIG. 1, an analytics consumer requests data analytics to NWDAF, which collects data from different entities to perform training and inference before producing the output analytics.

Referring to FIG. 1, an analytics consumer 102 may request a specific type of data analytics to NWDAF 100, which can be provided by NWDAF 100 in the form of statistics and/or predictions. The analytics consumers (e.g., the analytics consumer 102) defined in Rel-16 are 5GC NFs, Application Functions (AFs), and OAM. NWDAF 100 then triggers the input data collection by means of an exposure framework defined in [2] where the input data sources (e.g., 5GC NFs 104, AFs 106, and/or OAM 108).

The collected data is then used by NWDAF 100 to perform training and inference, possibly by an AI engine, but the definition of the models is outside the scope of standardization to provide enough flexibility to vendors. This also implies that the AI engine may reside outside NWDAF 100 itself, and the next release of the standard (Rel-17) has already started to study any required interface standardization to enable such NWDAF functional decomposition [3]. The same considerations apply to the input data collection module. In certain examples of the disclosure, it is assumed the AI engine and input data collection module reside within NWDAF 100, although the disclosure is not limited to this case.

In any case, the inference results are then fed to the analytics production entity within NWDAF 100, which delivers the statistics and/or predictions requested by the service consumer.

A number of data analytics types have also been introduced in 3GPP Rel-16, including analytics for network slice and application service experience, NF and network slice load, network performance, UE aspects (communication, mobility, expected and abnormal behavior), etc., as described in [2].

In addition to the above basic operation, the already ongoing Rel-17 is expanding the Rel-16 NWDAF framework by addressing a number of new use cases and key issues, including the above mentioned NWDAF functional decomposition, the architecture and interaction of multiple NWDAF instances, efficient data collection mechanisms, support for network slice service level agreement (SLA) guarantee, etc. [3].

Based on the above framework description, certain examples of the disclosure directly embed in the 5G architecture an autonomous capability to intelligently and dynamically set the inactivity timer value to each 5G PDU session of a UE. This approach has the advantage of being highly implementable in current and at least near-future networks, as the basic data collection capabilities of NWDAF used in certain examples of the disclosure have already been defined in the specifications.

In the following, an instantiation of the framework for the above-mentioned problem, as well as a description of the AI problem framed in the context of NWDAF data analytics, are described.

However, the skilled person will appreciate that the techniques described herein are not limited to setting or adjusting a timer value, but may be used to set or adjust any other suitable parameter in a network.

In the following, there is described an AI-based technique, leveraging NWDAF, for setting/adjusting an inactivity timer for activation and deactivation of the PDU sessions associated to the multiple services consumed by the UE. In particular, an overall NWDAF-based technique is described, which highlights the applicability of the technique to current standardized networks. A detailed procedure to instantiate the specific framework is also described.

Figure 2:
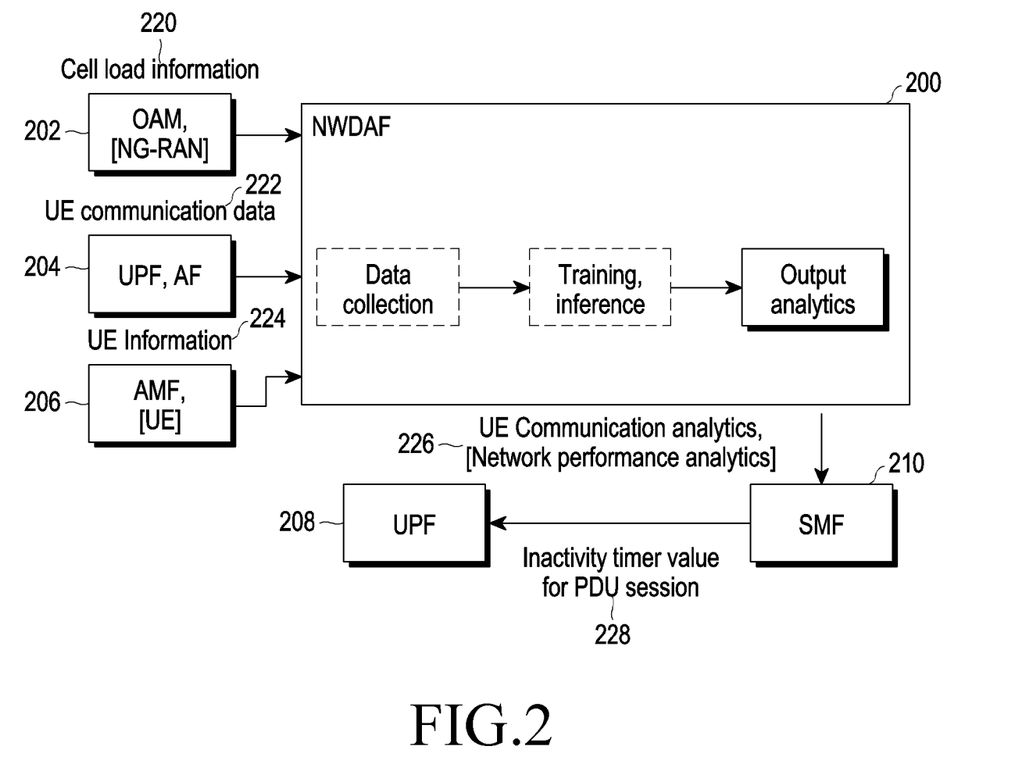
FIG. 2 illustrates an example of the disclosure based on NWDAF and multiple input data sources according to an embodiment of the disclosure.

FIG. 2 illustrates an overall NWDAF-based design, utilizing the Rel-16 data analytics framework (e.g., described in [1]) according to an embodiment of the disclosure. This example is based on multiple input data sources (e.g., OAM 202, SMF 210, UPF/AF 204 and AMF 206, and optionally NG-RAN and UE), the AI-based training and inference module in NWDAF 200, and the output analytics delivered to SMF 210 and forwarded to UPF 208. The skilled person will appreciate that the disclosure is not limited to these examples.

Referring to FIG. 2, the internal NWDAF architecture in this example follows the general principle shown in FIG. 1, where the generic analytics model outside the scope of standardization efforts has been replaced with a model based on inference, training that is described further below. Furthermore, FIG. 2 illustrates the input data sources used for the agent to learn the optimal inactivity timer value and provide the required analytics.

In order to respect the framework already agreed and frozen in 3GPP, certain examples of the disclosure may only require supported 5GC entities (i.e. SMF 210, UPF 208, AMF 206), AFs 204, and OAM 202 to provide input data. However, the disclosure is not limited to this case. For example, FIG. 2 indicates other various entities that could provide required input data to NWDAF 200 currently not supported in the standard, namely NG-RAN and the UE. In certain examples, these other entities are not required as they can be replaced by alternative entities currently supported. These other entities as data sources may be supported by future releases of the standard.

In addition, in the following it is described, in the context of an AI-based training and inference model, which specific input data may be used. In certain examples described below, all input data may be mapped to standardized NWDAF input data, for example UE communication data 222 (e.g., including start and end time stamps, uplink and downlink data rates, traffic volume, etc.), cell load information 220 measured in number of activated PDU sessions, and UE type [8]. In certain examples, as opposed to UE communication data and cell load, UE type or UE information 224 may need to be collected only once, since it does not change during the network operation.

With respect to the output analytics provided by NWDAF 200, certain examples of the disclosure may comply with the current 3GPP framework by generating data analytics (e.g., including UE communication analytics 226 and/or network performance analytics) in the form of 'optimal prediction values' for the session inactivity timer that can be directly fed to the SMF 210. NWDAF 200 may also provide past statistics of the timer value.

Hence, the data analytics delivered by NWDAF 200 may then be used by SMF 210 to (i) activate or deactivate PDU sessions when needed, and (ii) update the timer value (e.g., the timer value 228 for a PDU session) using the NWDAF predictions and inform UPF 208 of such update. Both actions may be performed, for example by SMF 210, for example by following the standardized procedures for PDU session activation and deactivation, as well as user plane management, defined in [4].

Data Analytics

In certain examples, to enable user plane connection optimization based on PDU session timer, the following existing NWDAF analytics as defined in [2] may be used. However, in their current form they may not be able to support various examples of the disclosure. Hence, certain examples of the disclosure extend the current definitions, as described below. In the following, UE communications analytics 226 and network performance analytics are described. However, the skilled person will appreciate that the disclosure is not limited to these specific examples.

UE Communications Analytics

An NWDAF supporting UE communication analytics may collect per-application communication description from AFs. In certain examples, if a consumer NF provides an Application ID, the NWDAF may only considers the data from AF, SMF and UPF that corresponds to this application ID.

The consumer of these analytics may indicate in the request one or more of the following non-limiting examples:
The Target of Analytics Reporting, which may be a single UE or a group of UEs.
Analytics Filter Information, optionally including one or more of the following non-limiting examples:
S-NSSAI;
DNN;
Application ID;
Area of Interest.
An Analytics target period indicating a time period over which the statistics and/or predictions are requested.
Preferred level of accuracy of the analytics (e.g., low/high).
A maximum number of objects;
In a subscription, the Notification Correlation ID and the Notification Target Address may be included.

a) Input data: Table 1 shows the current input data specification in [2] for UE communications analytics. Certain examples of the disclosure may use one or more pieces of such information. The skilled person will appreciate that the exact form of the input data, and/or the sources of such information, is not necessarily limited to the specific examples indicated in Table 1. Table 1 shows service data from 5GC related to UE communication.

TABLE 1

| Information | Source | Description |
| --- | --- | --- |
| UE ID | SMF, AF | SUPI in the case of SMF, external UE ID (i.e. GPSI) in the case of AF |
| Group ID | SMF, AF | To identify UE group if available Internal Group ID in the case of SMF, External Group ID in the case of AF |
| S-NSSAI | SMF | Information to identify a Network Slice |
| DNN | SMF | Data Network Name where PDU connectivity service is provided |
| Application ID | SMF, AF | Identifying the application providing this information |
| Expected UE Behaviour parameters | AF | Same as Expected UE Behaviour parameters specified in TS 23.502 [3] |
| UE communication (1 . . . max) | UPF, AF | Communication description per application |
| >Communication start | | The time stamp that this communication starts |
| >Communication stop | | The time stamp that this communication stops |
| >UL data rate | | UL data rate of this communication |
| >DL data rate | | DL data rate of this communication |
| >Traffic volume | | Traffic volume of this communication |
| Type Allocation code (TAC) | AMF | To indicate the terminal model and vendor information of the UE. The UEs with the same TAC may have similar communication behavior. The UE whose communication behavior is unlike other UEs with the same TAC may be an abnormal one. |

In certain examples of the disclosure, one or more pieces of input data shown in Table 2 may be used, for example in addition to one or more pieces of input data according to Table 1. In certain examples, some or all of the input data according to Table 2 may be collected as part of the UE communication service data, or as independent entries per PDU session. The skilled person will appreciate that the exact form of the input data, or the sources of such information, is not necessarily limited to the specific examples indicated in Table 2. Table 2 shows examples of additional Service Data from 5GC related to UE communication.

TABLE 2

| Additional input data | Source | Description |
| --- | --- | --- |
| (>) PDU Session ID (1 . . . max) | SMF | Identification of PDU Session(s) |
| > N4 Session ID | SMF, UPF | Identification of N4 Session |
| > Inactivity detection time | SMF, UPF | Value of session inactivity timer |
| > PDU Session status | SMF | Status of the PDU Session (activated, deactivated) |
| UE CM state | AMF | UE connection management state (e.g. CM-IDLE) | b) Output analytics: Table 3 shows the current output analytics specification in [2] for UE communications analytics. Statistics may not require the entry 'confidence' whereas predictions may do. Certain examples of the disclosure may generate one or more pieces of output analytics according to Table 3. The skilled person will appreciate that the exact form of the output analytics is not necessarily limited to the specific examples indicated in Table 3. Table 3 shows UE communications output analytics.

TABLE 3

| Information | Description |
| --- | --- |
| UE group ID or UE ID | Identifies an UE or a group of UEs, e.g. internal group ID defined in TS 23.501 [2] clause 5.9.7 or SUPI (see NOTE). |
| UE communications (1 . . . max) | List of communication time slots. |
| > Periodic communication indicator | Identifies whether the UE communicates periodically or not. |
| > Periodic time | Interval time of periodic communication (average and variance) if periodic. Example: every hour. |
| > Start time | Start time predicted (average and variance). |
| > Duration time | Duration interval time of communication. |
| > Traffic characterization | S-NSSAI, DNN, ports, other useful information. |
| > Traffic volume | Volume UL/DL (average and variance). |
| > Confidence | Confidence of the prediction. |
| > Ratio | Percentage of UEs in the group (in the case of an UE group). |

In certain examples of the disclosure, one or more pieces of output analytics shown in Table 4 may be generated, for example in addition to one or more pieces of output analytics according to Table 3. The skilled person will appreciate that the exact form of the output analytics is not necessarily limited to the specific examples indicated in Table 4. Table 4 shows examples of additional output analytics data for UE communication.

TABLE 4

| Additional Information | Description |
|---|---|
| (>) PDU Session ID (1 . . . max) | Identification of the PDU Session(s) |
| > N4 Session ID | Identification of N4 Session |
| > Inactivity detection time | Value of session inactivity timer (average, variance) |

Network Performance Analytics

In certain examples of the disclosure, network performance analytics by NWDAF may be used (in addition or alternatively to UE communications and/or other analytics) to optimize the performance of the user plane. For example, SMF may use network performance analytics in addition to UE communication analytics to derive timer values that optimize not only the performance of the individual UEs but also the network as a whole in general, and the RAN in particular.

a) Input data: Table 5 shows the current input data specification in [2] for UE communications analytics. Certain examples of the disclosure may use one or more pieces of such information. The skilled person will appreciate that the exact form of the input data, and/or the sources of such information, is not necessarily limited to the specific examples indicated in Table 5. Table 5 shows input data for network performance analytics.

TABLE 5

| Load information | Source | Description |
|---|---|---|
| Status, load and performance information | OAM | Statistics on RAN status (up/down), load (i.e. Radio Resource Utilization) and performance per Cell Id in the Area of Interest as defined in TS 28.552 [8]. |
| NF Load information | NRF | Load per NF |
| Number of UEs | AMF | Number of UEs in an Area of Interest | b) Output analytics: Table 6 shows the current output analytics specification in [2] for network performance analytics. Statistics may not require the entry 'confidence' whereas predictions may do. Certain examples of the disclosure may generate one or more pieces of output analytics according to Table 6. The skilled person will appreciate that the exact form of the output analytics is not necessarily limited to the specific examples indicated in Table 6. Table 6 shows network performance output analytics.

TABLE 6

| Information | Description |
|---|---|
| List of network performance information (1 . . . max) | Predicted analytics during the Analytics target period |
| > Area subset | TA or Cell ID within the requested area of interest as defined in clause 6.6.1 |
| > Analytics target period subset | Time window within the requested Analytics target period as defined in clause 6.6.1. |
| > gNB status information | Average ratio of gNBs that will be up and running during the entire Analytics target period in the area subset |
| >gNB resource usage | Average usage of assigned resources (CPU, memory, disk) (average, peak) |
| > Number of UEs | Average number of UEs predicted in the area subset |
| > Communication performance | Average ratio of successful setup of PDU Sessions |

TABLE 6-continued

| Information | Description |
|---|---|
| > Mobility performance | Average ratio of successful handover |
| > Confidence | Confidence of this prediction |

In certain examples of the disclosure, one or more pieces of output analytics shown in Table 7 may be generated, for example in addition to one or more pieces of output analytics according to Table 6. The skilled person will appreciate that the exact form of the output analytics is not necessarily limited to the specific examples indicated in Table 7. For example, certain examples may generate output analytics indicated below in bold+italics. Table 7 shows examples of additional network performance output analytics.

TABLE 7

| Information | Description |
|---|---|
| > gNB resource usage | Average usage of assigned resources (spectrum, CPU, memory, disk) |
| > Outage | Average amount of network outage in the area subset during analytics target period |

Figure 3A:
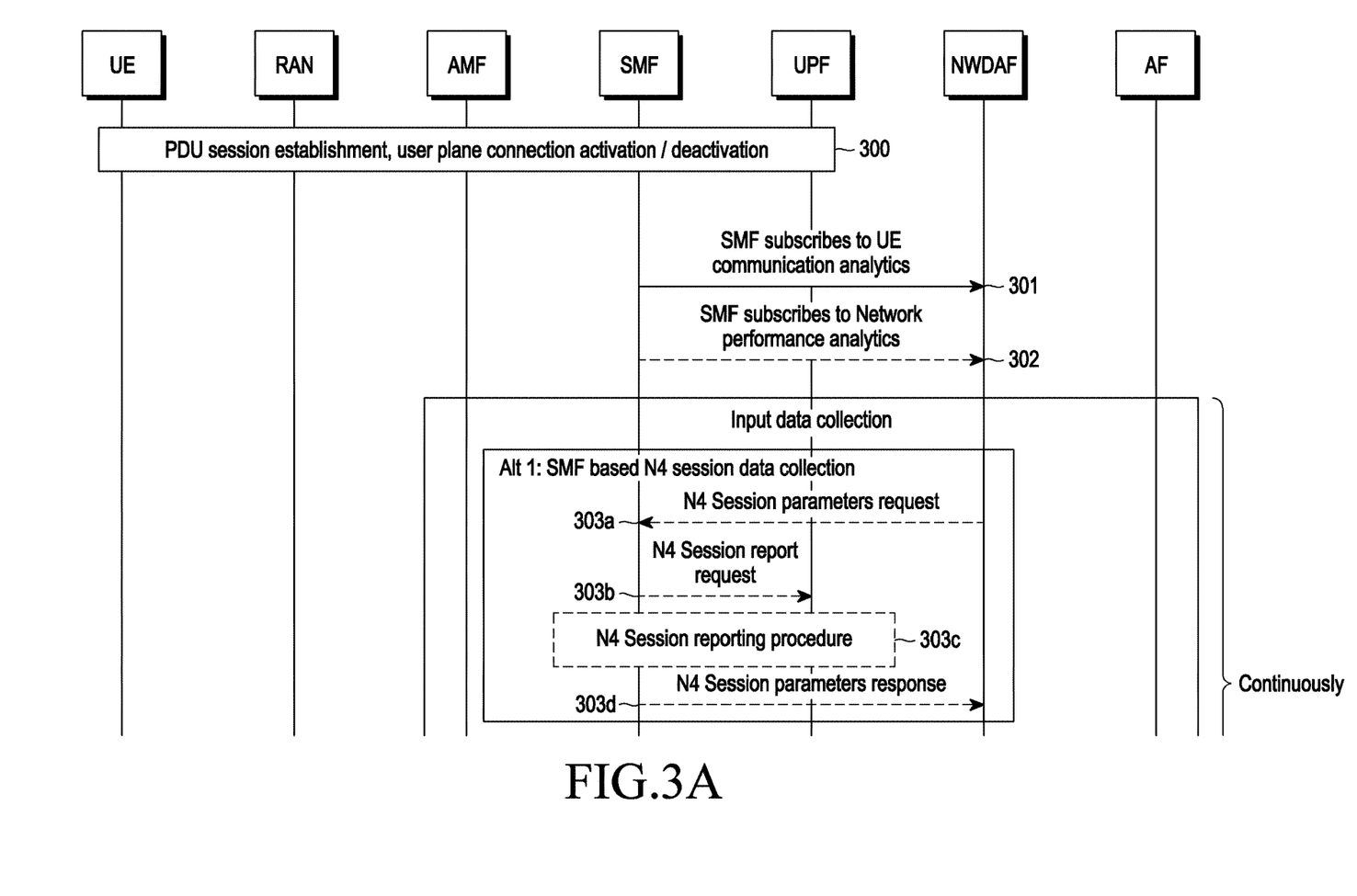
FIGS. 3A and 3B illustrate a procedure to support NWDAF-based user plane optimization according to various embodiments of the disclosure.
Figure 3B:
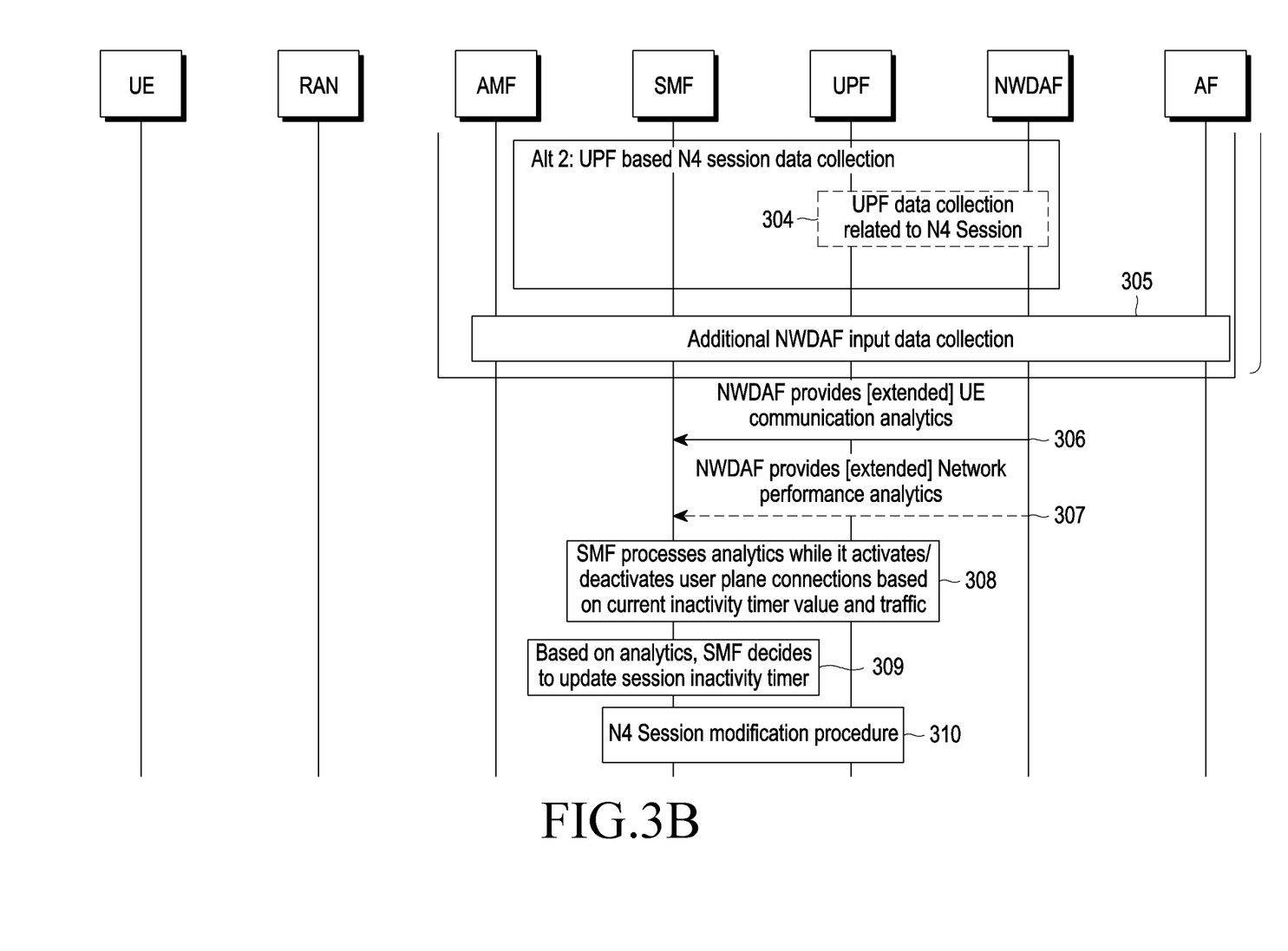

FIGS. 3A and 3B illustrate a procedure to support NWDAF-based user plane optimization according to various embodiments of the disclosure.

A procedure supporting NWDAF-based user plane optimization is illustrated in FIGS. 3A and 3B. The various operations in the procedure are described below. In various examples, certain operations (e.g., those indicated with dotted arrows/boxes) may be omitted. For conciseness, FIGS. 3A and 3B illustrate two alternative sets of operations (Alt 1 and Alt 2). In various examples, one or the other of these alternatives may be used. The skilled person will appreciate that the disclosure is not limited to the specific example of FIGS. 3A and 3B.

Referring to FIGS. 3A and 3B, at operation 300, a PDU Session may get established through UE, RAN, AMF, SMF, and UPF. A corresponding user plane connection needs to be activated for data transmission. During the course of the procedure the user plane connection may get deactivated if the inactivity timer expires, and activated if new data traffic is available.

At operation 301, the SMF (e.g., the SMF 210) subscribes to UE communication analytics from the NWDAF (e.g., the NWDAF 200).

At operation 302, [OPTIONAL] the SMF may subscribe to network performance analytics from the NWDAF.

Input data collection: Two alternatives are possible for data collection related to N4 Session.

Alternative 1 uses the SMF and its corresponding service exposure framework to retrieve the required input data described in the disclosure while Alternative 2 relies on implementation-specific mechanisms for UPF input data retrieval.

Alternative 1 [ALL MESSAGES OPTIONAL]: the SMF based N4 session data collection

At operation 303a, the NWDAF may request N4 Session related input data to the SMF as defined in Table 2. It may also request other UE communication data with the SMF as source NF, for example, as specified in TS 23.288 [2] and Table 2.

At operation 303b, the SMF may request a N4 Session Level report to the UPF (e.g., UPF 208).

At operation 303c, the UPF may provide the requested N4 Session Level report to the SMF, for example, according to clause 4.4.2.2 in TS 23.502 [4].

At operation 303d, the SMF may provide the requested N4 Session related input data to the NWDAF.

Alternative 2: the UPF based N4 session data collection

At operation 304, [OPTIONAL] the NWDAF may collect N4 Session related input data directly from the UPF via implementation-specific mechanisms.

At operation 305, The NWDAF may collect the remaining input data required to produce the requested analytics, for example, according to TS 23.288 [2].

At operation 306, the NWDAF may provide UE Communication analytics to the SMF, for example, as defined in TS 23.288 [2] and Table 4.

At operation 307, [OPTIONAL] if operation 302 is performed, the NWDAF may provide network performance analytics to the SMF, for example, as specified in TS 23.288 [2]. It may also add output analytics data, for example, shown in Table 7.

At operation 308, while the SMF continues its task of activating and deactivating PDU Sessions, the SMF may also process the received analytics provided by the NWDAF.

At operation 309, based on its analysis of NWDAF analytics, the SMF may decide to update the user plane inactivity timer of certain PDU Session(s) associated to corresponding N4 Session(s).

At operation 310, the SMF may trigger a N4 Session modification procedure, for example, according to clause 4.4.1.3 in TS 23.502 [4] to inform the UPF of an update of the inactivity timer.

Certain examples of the disclosure provide a method for setting a value of an inactivity timer for transitioning between states of a data session in a network comprising a first entity and a second entity providing network analytics, the method performed by the second entity may include obtaining, by the second entity, input data comprising communication description information for at least one user equipment (UE), and providing, by the second entity to the first entity, output analytics generated based on the input data, the output analytics comprising UE communications analytics for each data session, wherein the output analytics are used to determining whether to update a value of an inactivity timer for a data session.

Certain examples of the disclosure provide a method for setting a value of an inactivity timer for transitioning between states of a data session in a network comprising a first entity and a second entity providing network analytics, the method performed by the first entity may include transmitting, by the first entity to the second entity, input data comprising communication description information for at least one user equipment (UE), receiving, by the first entity, from the second entity, output analytics generated based on the input data, the output analytics comprising UE communications analytics for each data session, and determining transitions between states of a data session by using a value of a inactivity timer for the data session updated based on the output analytics.

Certain examples of the disclosure provide an apparatus for setting a value of an inactivity timer for transitioning between states of a data session in a network comprising a first entity and a second entity providing network analytics, the apparatus of the second entity may include a transceiver, and a processor coupled with the transceiver and configured to perform the operations of obtaining input data comprising communication description information for at least one user equipment (UE), and providing, to the first entity output analytics generated based on the input data, the output analytics comprising UE communications analytics for each data session, wherein the output analytics are used to determining whether to update a value of an inactivity timer for a data session.

Certain examples of the disclosure provide an apparatus for setting a value of an inactivity timer for transitioning between states of a data session in a network comprising a first entity and a second entity providing network analytics, the apparatus of the first entity may include a transceiver, and a processor coupled with the transceiver and configured to perform the operations of transmitting, to the second entity, input data comprising communication description information for at least one user equipment (UE), receiving, from the second entity, output analytics generated based on the input data, the output analytics comprising UE communications analytics for each data session, and determining transitions between states of a data session by using a value of a inactivity timer for the data session updated based on the output analytics.

Certain examples of the disclosure provide a method, for a second entity (e.g., NWDAF) providing network analytics in a network comprising a first entity (e.g., SMF) and the second entity, the method comprising: obtaining input data comprising communication description information; and determining, based on the input data, output analytics comprising per-data session user equipment (UE) communications analytics, and providing the output analytics to the first entity. Based on the output analytics, the first entity may determine whether to update a timer value for a data session, the timer (e.g., inactivity timer) for transitioning between states (e.g., active/inactive state) of the data session (e.g., PDU session).

Certain examples of the disclosure provide a second entity (e.g., NWDAF) providing network analytics in a network comprising a first entity (e.g., SMF) and the second entity, the second entity being configured to: obtain input data comprising communication description information; and determine, based on the input data, output analytics comprising per-data session user equipment (UE) communications analytics, and provide the output analytics to the first entity. Based on the output analytics, the first entity may determine whether to update a timer value for a data session, the timer (e.g., inactivity timer) for transitioning between states (e.g., active/inactive state) of the data session (e.g., PDU session).

Certain examples of the disclosure provide a method for setting a value of a timer (e.g., inactivity timer) for transitioning between states (e.g., active/inactive state) of a data session (e.g., PDU session) in a network comprising a first entity (e.g., SMF) and a second entity (e.g., NWDAF) providing network analytics, the method comprising: obtaining, by the second entity, input data comprising communication description information; determining, by the second entity, based on the input data, output analytics comprising per-data session user equipment (UE) communications analytics, and providing the output analytics to the first entity; and based on the output analytics, determining, by the first entity, whether to update a timer value for a data session.

In certain examples, the method may further comprise receiving, by the second entity from the first entity, a request for (e.g., subscription to) the output analytics.

In certain examples, the request may comprise one or more of: a request for analytics relating to a specific UE or a group of UEs; and an analytics filter.

In certain examples, the analytics filter may specify one or more of the following as filter criteria: information specifying one or more S-NSSAI; information specifying one or more DNN; one or more application ID; information indicating one or more area of interest; information specifying an analytics target period indicating the time period over which statistics and/or predictions are requested; information indicating a preferred level of accuracy of the analytics (e.g., low/high); information specifying a maximum number of objects; and in a subscription, a notification correlation ID and a notification target address.

In certain examples, obtaining the input data may comprise: transmitting, by the second entity to the first entity, a request for session parameters (e.g., N4 session parameters); transmitting, by the first entity to a third entity (e.g., UPF), a request for a session report (e.g., N4 Session report); receiving, by the first entity from the third entity, the session parameters; and transmitting, by the first entity to the second entity, the session parameters.

In certain examples, obtaining the input data may comprise performing, with a third entity (e.g., UPF), a procedure for obtaining session parameters (e.g., N4 session parameters) directly from the third entity.

In certain examples, the input data may further comprise additional input data obtained from one or more network entities (e.g., AMF, SMF, UPF, OAM, one or more AFs, NG-RAN and/or UE).

In certain example, obtaining the input data may be performed continuously.

In certain examples, the method may further comprise, if it is determined to update the timer value, initiating a procedure (e.g., N4 session modification procedure) to update the timer value.

In certain examples, the method may further comprise transitioning between states of a data connection based on a corresponding timer value (and optionally traffic).

In certain examples, the input data may comprise one or more pieces of the information specified in Table 1.

In certain examples, the input data may comprise one or more of: an identification of one or more PDU Sessions (e.g., obtained from SMF); an identification of an N4 Session (e.g., obtained from SMF and/or UPF); a value of a session inactivity timer (e.g., obtained from SMF and/or UPF); information indicating the status (e.g., activated or deactivated) of one or more PDU Sessions (e.g., obtained from SMF); and one or more UE states throughout an analytics target period (e.g., obtained from AMF).

In certain examples, the UE communications analytics may comprise one or more pieces of the information specified in Table 3.

In certain examples, the UE communications analytics may comprise one or more of: an identification of one or more PDU Sessions; an identification of an N4 Session; and a value of session inactivity timer (e.g., average or variance).

In certain examples, the output analytics may further comprise network performance analytics.

In certain examples, the input data may comprise one or more pieces of the information specified in Table 5.

In certain examples, the network performance analytics may comprise one or more pieces of the information specified in Table 6.

In certain examples, the network performance analytics may comprise one or more of: an average usage of assigned resources (e.g., spectrum, CPU, memory and/or disk); and an average amount of network outage in an area subset during an analytics target period.

In certain examples, the input data may comprise communication description information relating to one or more of: an Application Function (AF); a data session; a UE; a network slice; and a data network.

Certain examples of the disclosure provide a network comprising a first entity (e.g., SMF) and a second entity (e.g., NWDAF), the network being configured to operate according to any method disclosed herein.

Certain examples of the disclosure provide a first entity (e.g., SMF) or a second entity (e.g., NWDAF) being configured to operate in a network according to the preceding example.

Certain examples of the disclosure provide a computer program comprising instructions which, when the program is executed by a computer or processor, cause the computer or processor to carry out any method disclosed herein.

Certain examples of the disclosure provide a computer or processor-readable data carrier having stored thereon a computer program according to the preceding example.

In certain examples of the disclosure, the value of the inactivity timer may be set for activation and deactivation of data sessions associated with multiple services in the network.

In certain examples of the disclosure, the input data may comprise UE communication data, cell load measured in number of activated data sessions, and UE type.

In certain examples of the disclosure, the UE communication data may comprise at least one of start and end time stamps, uplink and downlink data rates, traffic volume.

Figure 4:
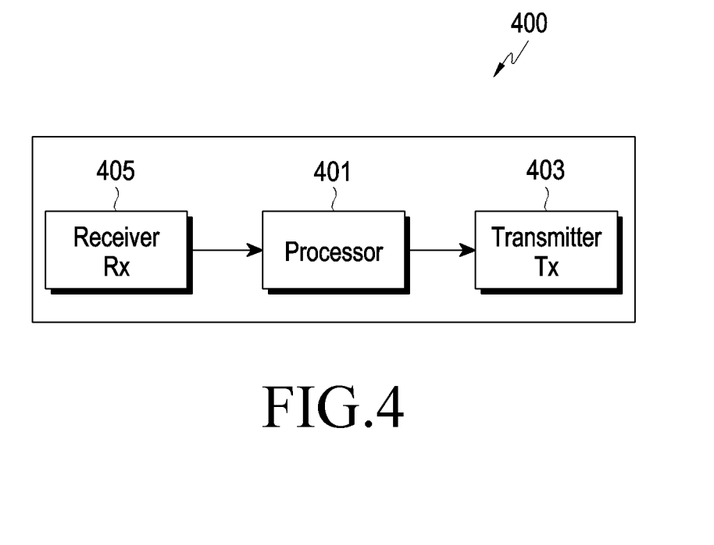
FIG. 4 is a block diagram of a network entity that may be used in certain examples according to an embodiment of the disclosure.

FIG. 4 is a block diagram of a network entity that may be used in examples according to an embodiment of the disclosure. For example, the UE, AMF, SMF, UPF, NWDAF, AF and/or other NFs may be provided in the form of the network entity illustrated in FIG. 4. The skilled person will appreciate that the network entity illustrated in FIG. 4 may be implemented, for example, as a network element on a dedicated hardware, as a software instance running on a dedicated hardware, or as a virtualized function instantiated on an appropriate platform, e.g., on a cloud infrastructure.

Referring to FIG. 4, the entity 400 may comprise at least one of a processor (or controller) 401, a transmitter 403 and a receiver 405. The receiver 405 may be configured for receiving one or more messages or signals from one or more other network entities wirelessly or by wire. The transmitter 403 may be configured for transmitting one or more messages or signals to one or more other network entities wirelessly or by wire. The processor 401 may be configured for performing one or more operations and/or functions as described above. For example, the processor 401 may be configured for performing the operations of a UE, AMF, SMF, UPF, NWDAF, AF and/or other NFs.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the disclosure may be implemented in the form of hardware, software or any combination of hardware and software. Any such software may be stored in the form of volatile or non-volatile storage, for example a storage device like a read-only memory (ROM), whether erasable or rewritable or not, or in the form of memory such as, for example, random-access memory (RAM), memory chips, device or integrated circuits or on an optically or magnetically readable medium such as, for example, a compact disc (CD), digital versatile disc (DVD), magnetic disk or magnetic tape or the like.

It will be appreciated that the storage devices and storage media are embodiments of machine-readable storage that are suitable for storing a program or programs comprising instructions that, when executed, implement certain examples of the disclosure. Accordingly, certain example provides a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the disclosure has been shown and described with reference to various embodiments thereof, it will be understood by those skilled in the art that various changes in form and detail may be made therein without departing from the spirit and scope of the disclosure, as defined by any appended claims and their equivalents.

What is claimed is:

1. A method for setting a value of an inactivity timer for transitioning between states of a data session in a network comprising a session management function (SMF) and a network data analytics function (NWDAF) providing network data analytics, the method performed by the NWDAF comprising:
   receiving, from the SMF, first input data comprising at least one of a protocol data unit (PDU) session ID to identify a PDU session related to a user equipment (UE), a N4 session ID to identify a N4 session between the SMF and a user plane function (UPF), an inactivity detection time related to an inactivity timer, or a PDU session status indicating whether a status of the PDU session is activated or deactivated;
   receiving, from an access and mobility management function (AMF), second input data comprising a UE connection management (CM) state of the UE; and
   transmitting, to the SMF, analytics results provided by the NWDAF based on at least one of the first input data or the second input data, the analytics results comprising the N4 session ID and the inactivity detection time.

2. The method according to claim 1, further comprising:
   receiving, from the UPF, information related to at least one of the N4 session ID or the inactivity detection time.

3. The method according to claim 1,
   wherein the analytics results further comprises network performance analytics, and
   wherein the network performance analytics comprises one or more of:
     an average usage of assigned resources, or
     an average amount of network outage in an area subset during an analytics target period.

4. The method according to claim 1, further comprising:
   receiving, from the SMF, a request for the analytics results,
   wherein the request comprises information related to an analytics filter, and
   wherein the information related to the analytics filter comprises one or more of the following as filter criteria:
     information specifying one or more single network slice selection assistance information,
     information indicating one or more area of interest,
     information specifying an analytics target period indicating a time period over which statistics and/or predictions are requested,
     information indicating a preferred level of accuracy of the analytics,
     information specifying a maximum number of objects, and
     in a subscription, a notification correlation ID and a notification target address.

5. The method according to claim 1,
   wherein the analytics results are used by the SMF to decide to update a value of the inactivity timer for the PDU session, and
   wherein the SMF is configured to decide whether to update the value of the inactivity timer for the PDU session, update the value of the inactivity timer based on determining to update the value of the inactivity timer, and inform the UPF of the updated value to determine transitions between states of the PDU session.

6. A method for setting a value of an inactivity timer for transitioning between states of a data session in a network comprising a session management function (SMF) and a network data analytics function (NWDAF) providing network data analytics, the method performed by the SMF comprising:
   transmitting, to the NWDAF, first input data comprising at least one of a protocol data unit (PDU) session ID to identify a PDU session related to a user equipment (UE), a N4 session ID to identify a N4 session between the SMF and a user plane function (UPF), an inactivity detection time related to an inactivity timer, or a PDU session status indicating whether a status of the PDU session is activated or deactivated;
   after transmitting the first input data, receiving, from the NWDAF, analytics results provided by the NWDAF based on at least one of the first input data or second input data, the second input data comprising a UE connection management (CM) state of the UE and provided from an access and mobility function (AMF) to the NWDAF, the analytics results comprising the N4 session ID and the inactivity detection time;
   deciding to update a value of the inactivity timer for the PDU session based on the analytics results; and
   informing the UPF of the updated value to determine transitions between states of the PDU session by using the updated value of the inactivity timer.

7. The method according to claim 6, wherein at least one of the N4 session ID or the inactivity detection time is received to the SMF from the UPF.

8. The method according to claim 6,
   wherein the analytics results further comprises network performance analytics, and
   wherein the network performance analytics comprises one or more of:
     an average usage of assigned resources, or
     an average amount of network outage in an area subset during an analytics target period.

9. The method according to claim 6, further comprising:
   receiving, from the NWDAF, a request for session parameters related to sessions between the SMF and the UPF;
   transmitting, to the UPF, a request for a session report;
   receiving, from the UPF, the session parameters; and
   transmitting, to the NWDAF, the session parameters.

10. The method according to claim 6, further comprising:
transmitting, to the NWDAF, a request for the analytics results,
wherein the request comprises information related to an analytics filter, and
wherein the information related to the analytics filter comprises one or more of the following as filter criteria:
information specifying one or more single network slice selection assistance information,
information indicating one or more area of interest,
information specifying an analytics target period indicating a time period over which statistics and/or predictions are requested,
information indicating a preferred level of accuracy of the analytics,
information specifying a maximum number of objects, and
in a subscription, a notification correlation ID and a notification target address.

11. An apparatus for setting a value of an inactivity timer for transitioning between states of a data session in a network comprising a session management function (SMF) and a network data analytics function (NWDAF) providing network data analytics, the apparatus of the NWDAF comprising:
a transceiver; and
a processor coupled with the transceiver and configured to:
receive, from the SMF, first input data comprising at least one of a protocol data unit (PDU) session ID to identify a PDU session related to a user equipment (UE), a N4 session ID to identify a N4 session between the SMF and a user plane function (UPF), an inactivity detection time related to an inactivity timer, or a PDU session status indicating whether a status of the PDU session is activated or deactivated,
receive, from an access and mobility management function (AMF), second input data comprising a UE connection management (CM) state of the UE, and
transmit, to the SMF, analytics results provided by the NWDAF based on at least one of the first input data or the second input data, the analytics results comprising the N4 session ID and the inactivity detection time.

12. The apparatus according to claim 11, wherein the processor is further configured to:
receive, from the UPF, information related to at least one of the N4 session ID or the inactivity detection time.

13. The apparatus according to claim 12,
wherein the analytics results further comprises network performance analytics, and
wherein the network performance analytics comprises one or more of:
an average usage of assigned resources, or
an average amount of network outage in an area subset during an analytics target period.

14. The apparatus according to claim 11, wherein the processor is further configured to:
receive, from the SMF, a request for the analytics results,
wherein the request comprises information related to an analytics filter, and
wherein the information related to the analytics filter comprises one or more of the following as filter criteria:
information specifying one or more single network slice selection assistance information,
information indicating one or more area of interest,
information specifying an analytics target period indicating a time period over which statistics and/or predictions are requested,
information indicating a preferred level of accuracy of the analytics,
information specifying a maximum number of objects, and
in a subscription, a notification correlation ID and a notification target address.

15. The apparatus according to claim 11,
wherein the analytics results are used by the SMF to decide to update a value of the inactivity timer for the PDU session, and
wherein the SMF is configured to decide whether to update the value of the inactivity timer for the PDU session, update the value of the inactivity timer based on determining to update the value of the inactivity timer, and inform the UPF of the updated value to determine transitions between states of the PDU session.

16. An apparatus for setting a value of an inactivity timer for transitioning between states of a data session in a network comprising a session management function (SMF) and a network data analytics function (NWDAF) providing network data analytics, the apparatus of the SMF comprising:
a transceiver; and
a processor coupled with the transceiver and configured to:
transmit, to the NWDAF, first input data comprising at least one of a protocol data unit (PDU) session ID to identify a PDU session related to a user equipment (UE), a N4 session ID to identify a N4 session between the SMF and a user plane function (UPF), an inactivity detection time related to an inactivity timer, or a PDU session status indicating whether a status of the PDU session is activated or deactivated,
receive, from the NWDAF, analytics results provided by the NWDAF based on the at least one of the first input data or second input data, after transmitting the first input data, the second input data comprising a UE connection management (CM) state of the UE and provided from an access and mobility function (AMF) to the NWDAF, the analytics results comprising UE communications analytics,
deciding to update a value of the inactivity timer for the PDU session based on the analytics results, and
inform the UPF of the updated value to determine transitions between states of the PDU session by using the updated value of the inactivity timer.

17. The apparatus according to claim 16, wherein at least one of the N4 session ID or the inactivity detection time is received to the SMF from the UPF.

18. The apparatus according to claim 16,
wherein the analytics results further comprises network performance analytics, and
wherein the network performance analytics comprises one or more of:
an average usage of assigned resources, or
an average amount of network outage in an area subset during an analytics target period.

19. The apparatus according to claim 16, wherein the processor is further configured to:
- receive, from the NWDAF, a request for session parameters related to sessions between the SMF and the UPF;
- transmit, to the UPF, a request for a session report;
- receive, from the UPF, the session parameters; and
- transmit, to the NWDAF, the session parameters.

20. The apparatus according to claim 16, wherein the processor is further configured to:
- transmit, to the NWDAF, a request for the analytics results,
- wherein the request comprises information related to an analytics filter, and
- wherein the information related to the analytics filter comprises one or more of the following as filter criteria:
  - information specifying one or more single network slice selection assistance information,
  - information indicating one or more area of interest,
  - information specifying an analytics target period indicating a time period over which statistics and/or predictions are requested,
  - information indicating a preferred level of accuracy of the analytics,
  - information specifying a maximum number of objects, and
  - in a subscription, a notification correlation ID and a notification target address.

* * * * *